(12) United States Patent  (10) Patent No.: US 8,720,364 B2
Massey  (45) Date of Patent: May 13, 2014

(54) APPARATUS AND PROCESS FOR APPLYING LIQUID TO AN OBJECT

(76) Inventor: Michael Massey, Carrollton, TX (US)

( * ) Notice: Subject to any disclaimer, the term of this patent is extended or adjusted under 35 U.S.C. 154(b) by 0 days.

(21) Appl. No.: 13/330,863

(22) Filed: Dec. 20, 2011

(65) Prior Publication Data
US 2012/0160268 A1 Jun. 28, 2012

Related U.S. Application Data

(60) Provisional application No. 61/425,878, filed on Dec. 22, 2010.

(51) Int. Cl.
B05C 5/02 (2006.01)
B05B 13/02 (2006.01)
B05B 15/04 (2006.01)
B05C 3/10 (2006.01)
B27K 3/02 (2006.01)

(52) U.S. Cl.
CPC ......... *B05B 13/0214* (2013.01); *B05B 15/0406* (2013.01); *B05C 3/10* (2013.01); *B27K 3/0228* (2013.01); *Y10S 118/04* (2013.01)
USPC ................. 118/66; 118/62; 118/63; 118/315; 118/316; 118/DIG. 4

(58) Field of Classification Search
CPC .. B05B 13/0214; B05B 15/0406; B05C 3/10; B27K 3/0228
USPC ............... 118/66, 62, 63, 226, 227, 255, 256, 118/258, 315, 316, 407, 423, 424, DIG. 4; 134/15, 63, 172–176
See application file for complete search history.

(56) References Cited

U.S. PATENT DOCUMENTS 3,099,541 A * 7/1963 Hildebrand ..................... 34/422
3,678,890 A * 7/1972 Ehrensing et al. ............... 118/63
6,625,835 B1 * 9/2003 Frost et al. ......................... 15/77

FOREIGN PATENT DOCUMENTS

EP 0338335 * 10/1989

* cited by examiner

Primary Examiner — Laura Edwards
(74) Attorney, Agent, or Firm — Jonathan Szarzynski; Szarzynski PLLC

(57) ABSTRACT

A portable machine and process is described for covering all sides of an elongated object with a liquid without the use of brushes. The machine is particularly useful with manufactured building products such as a fence picket, trim, molding, or any other type of board. The machine generally has four stations, an entry station that drives the object down a track, a liquid application station where the object is covered by liquid that is poured over the object, a blower station where the fluid is spread evenly over the object and excess fluid is blown off, and an exit station that continues to pull the object down the track and directs the object as the object leaves the exit station. Finally, the object may enter a releasably attached drop track.

15 Claims, 6 Drawing Sheets

APPARATUS AND PROCESS FOR APPLYING LIQUID TO AN OBJECT

CROSS-REFERENCE TO RELATED APPLICATIONS

This application claims the benefit of provisional patent application No. 61/425,878 filed on Dec. 22, 2010.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of devices and processes used for applying liquids to objects. More particularly, the present invention is in the technical field of portable apparatuses and processes that are exceptionally useful for staining lumber on-site before the lumber is used to create a structure, such as a deck or a fence.

Elongated objects are regularly covered with a liquid. For example, when a wooden fence is constructed, the wood is almost always treated with a liquid, such as a stain or paint. This treatment may occur at various locations between the source of the lumber and the construction site, or it may occur at the construction site. Current methods of treatment include dipping lumber in pools of liquid, typically in very large quantities, using brushes or brush-rollers to apply and/or distribute the liquid, or applying the liquid using a spray, or atomization method. Each of these described current methods present problems including having a limited selection of colors or types of liquids that are applied, cleaning and maintaining brushes, and creating clouds of atomized liquids that travel to surfaces that are not intended to be treated.

The present invention offers a solution that can be used at various locations along the supply route of the object to be treated, including the actual job site. The solution can be portable, and does not create the nuisances of brushes or atomization processes.

Further, the present invention materially enhances the environment of mankind by offering a solution that does not require brushes. Brushes require cleaning and replacement. Often, the brushes are cleaned with toxic chemicals such as ethyl acetate, toluene, turpentine, and other known pollutants and/or carcinogens. Even more, when the brushes are replaced, the old brushes are typically discarded. Therefore, the use of the present invention eliminates the use of toxic chemicals and eliminates the creation of discarded physical waste, and thus contributes to the restoration and maintenance of the basic life sustaining natural elements including water and soil.

SUMMARY OF THE INVENTION

The present invention is an apparatus and process that applies a liquid to an elongated object. The apparatus can be portable, and generally includes multiple stations. The first station drives the object down a track. The second station is brushless, and applies a liquid using waterfalls and pools. The second station also reclaims and reuses unused liquid. The third station applies a current of gas to evenly apply and remove excess liquid. The apparatus further includes an exit station that adds additional means for driving the object through the machine, and means for directing the object while exiting the apparatus. The process includes feeding an elongated object into one side of an apparatus, driving an object through a station that applies liquid by waterfalls and pools, and driving the object through a station that applies a strong current of air.

DETAILED DESCRIPTION OF THE APPARATUS

Figure 1:
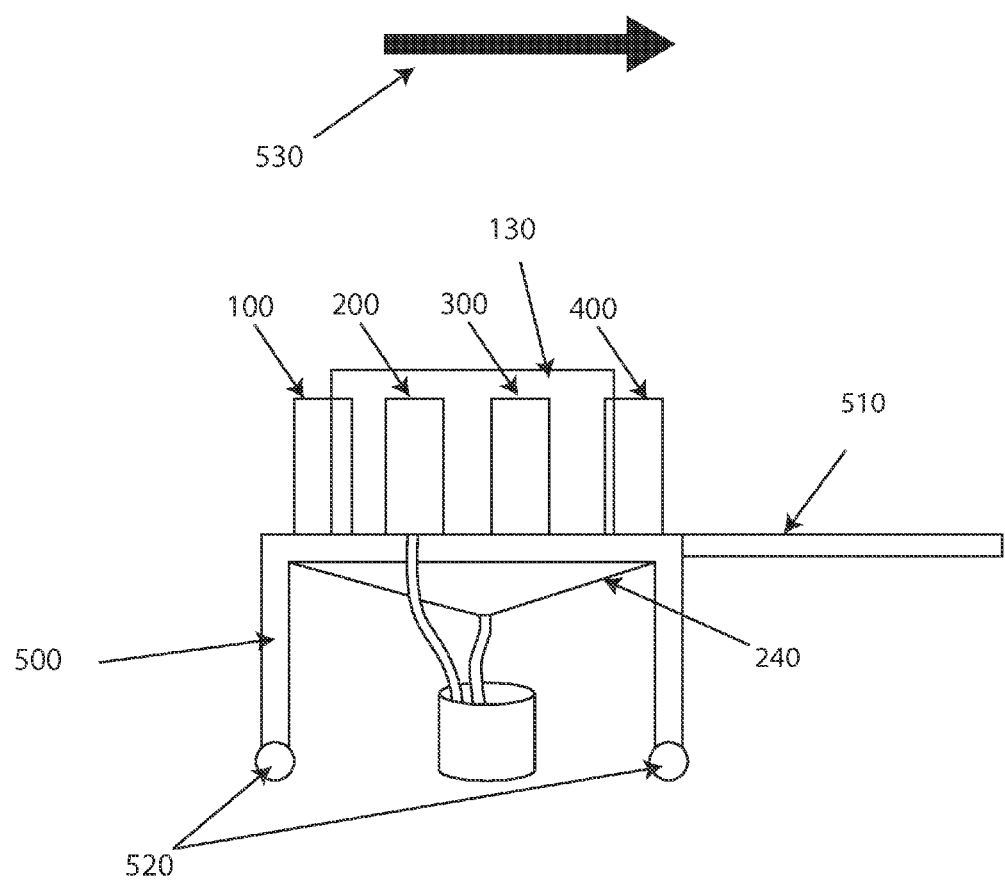
FIG. 1 is a side view of the apparatus.

Referring now to the apparatus in more detail, FIG. 1 is a side view of an apparatus that applies a liquid to an object. The apparatus is useful for applying a fluid to a manufactured building product like manufactured lumber. The machine is configurable to accept objects of varying size, including lumber with a cross section of one inch by two inches and objects with rectangular cross sections of two inches by ten inches.

Still referring to FIG. 1, frame 500 is shown with optional rolling means 520. Attached to frame 500 is entry drive station 100, liquid application station 200, blower station 300, exit station 400, splash guard 130, and drop track 510. An object is placed into entry drive station 100, and driven through the apparatus in direction 530, through liquid application station 200, blower station 300, and exit station 400, until the object has completely left exit station 400 and is on drop track 510. Splash guard 130 surrounds the stations and provides a means of confining the chemicals used during the process inside the machine, and protecting operators of the machine from the chemicals used and the moving parts of the apparatus.

Still referring to the apparatus shown in FIG. 1, the construction details of frame 500 and drop track 510 are that they are constructed of a rigid material, such as metal. However, any rigid material will work, including lumber.

Still referring to the invention shown in FIG. 1, rolling means 520 are shown. Rolling means allow for the apparatus to roll, and include wheels or casters. The invention is not limited by rolling means 520.

Still referring to the apparatus shown in FIG. 1, drop track 510 is shown. In the preferred embodiment, drop track 510 is inclined slightly so that excess liquid travels back towards exit station 400. Further, drop track 510 may have means of aiding the travel of the object, such as rolling means, including wheels, rollers, or bearings. In addition, the preferred embodiment includes a removable, or releasably attached drop track 510.

Figure 2:
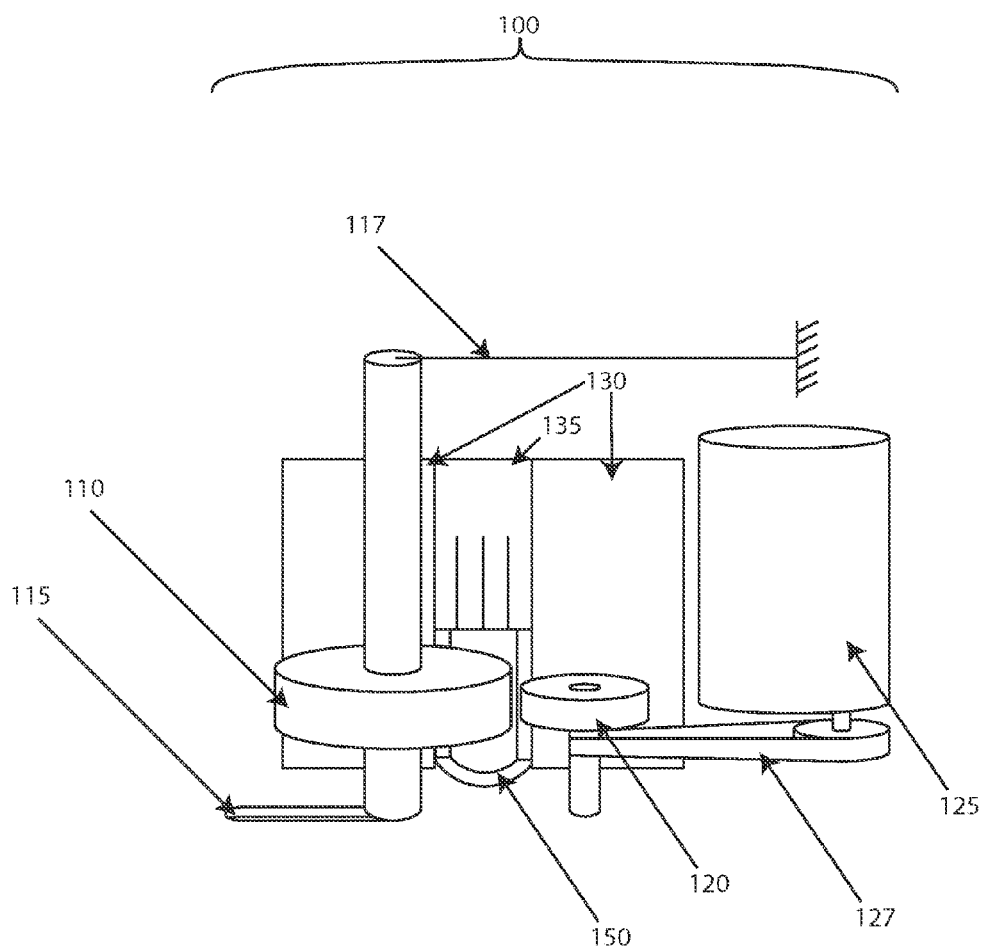
FIG. 2 is a front view of an entry drive station of the present invention.

Referring now to the apparatus shown in FIG. 2, entry drive station 100 is shown. Entry drive station 100, or infeed station 100, includes Entry pressure wheel 110 and entry drive wheel 120. Said wheels are also referred to as rollers. An elongated object, such as lumber, is placed between these two wheels in an upright position (See FIG. 4A for upright position) and driven through the machine by drive wheel 120. Entry pressure wheel 110 can include an axle, and is attached to entry adjustment means 115 and entry tension means 117. In the preferred mode, entry pressure wheel 110 includes an axle installed within a slot so that it is free to move longitudinally so that the relative position between the pressure roller and drive roller can change. Said slot is entry adjustment means 115. Entry tension means 117 constantly apply force to entry pressure wheel 110 in the direction towards entry drive wheel 120. In the preferred embodiment, tension means 117 is a spring fixedly attached to frame 500 and the axle of drive wheel 110. Further, in the preferred embodiment, there exits two entry adjustment means 115 and two entry tension means 117, one set at the top and one set at the bottom of entry pressure wheel 110. This configuration allows for entry pressure wheel 110 to move away from entry drive wheel 120 so that objects may be placed between the two wheels, including objects of different widths. In other words, entry adjustment means 115 and entry tension means 117 is a mechanism for allowing for the distance between entry drive roller 120 and entry pressure roller 110 to change. Pressure is applied by entry pressure wheel 110 to the object and thus pressuring the object against entry drive wheel 120, allowing entry drive wheel 120 to drive the object through the machine.

Still referring to the apparatus shown in FIG. 2, entry drive motor 125 is shown. Entry drive motor 125 provides power to entry drive wheel 120. In the preferred embodiment, entry drive motor 125 is an electric motor that provides power to entry drive wheel 120 via entry drive means 127. In the preferred embodiment, entry drive means 127 is a chain and sprocket configuration. Other embodiments include gas-powered engines, belt drives, and configurations that do not require entry drive means 127 because entry drive wheel 120 is directly attached to entry drive motor 125.

Still referring to the apparatus shown in FIG. 2, splash guard 130 is shown. While the present apparatus is in use, chemicals may splash or spray the operators of the machine. Thus, splash guard 130 is installed to prevent this occurrence. Similarly, entry splash guard flap 135 provides protection from the liquid within the machine, and also allows for the object to pass through it. In the preferred embodiment, entry splash guard flap 135 is a series of thin strips attached above track 150.

Still referring to the apparatus shown in FIG. 2, track 150 is shown. Track 150 runs through all four stations, including station 100. Track 150 is wide enough to accommodate an object being treated by the apparatus when the object is placed on its shortest side, assuming that the object has a rectangular cross section. The liquid used by the apparatus is preferably an oil-based, low viscosity liquid because the liquid provides a means of lubrication between the object being treated and track 150. In the preferred embodiment, the apparatus does not have rolling aids on the track between the entry and exit stations. Track 150 may be made of a permeable material, or may have drain holes at any point as needed.

Figure 3:
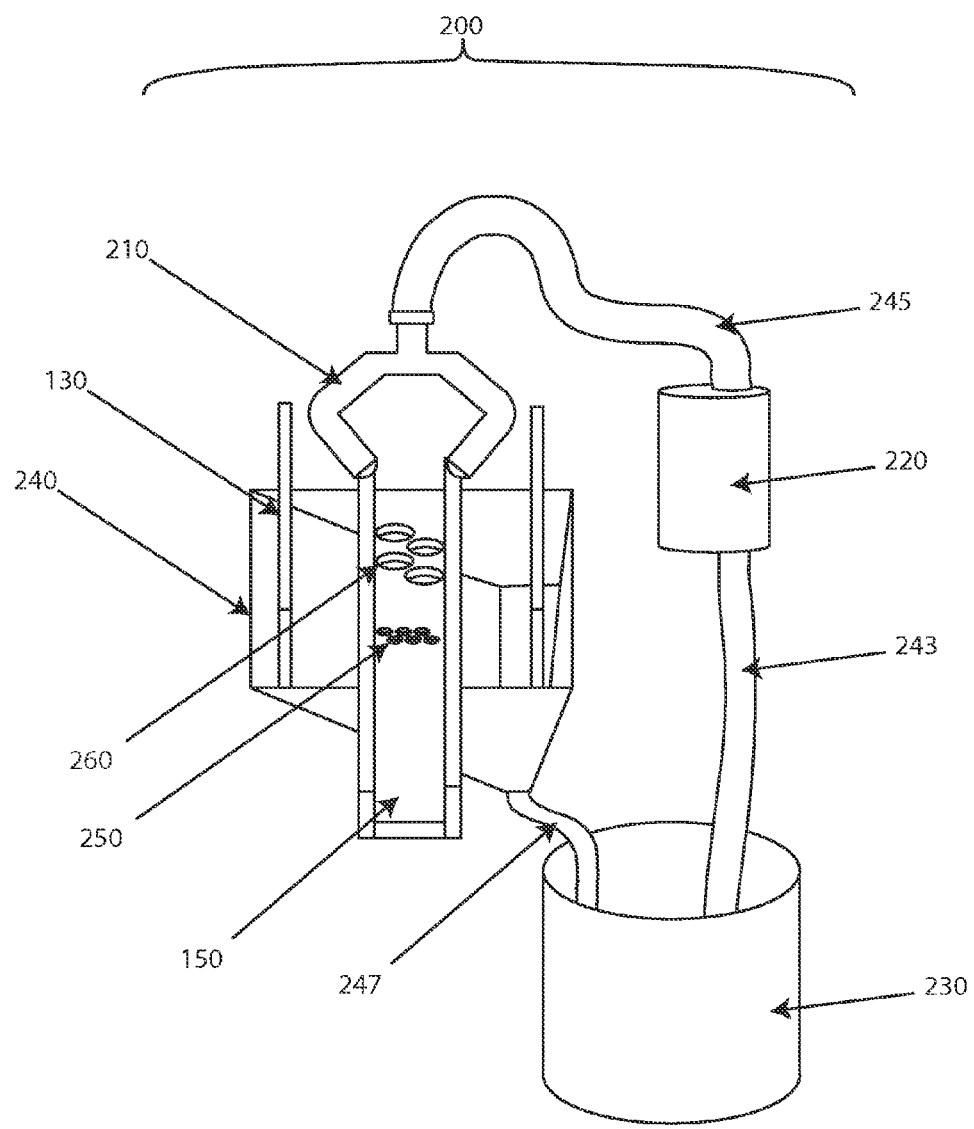
FIG. 3 is a front view of a liquid application station.

Referring now to the apparatus shown in FIG. 3, liquid application station 200, also referred to as the waterfall-pool system, is shown. Liquid application station 200 is the primary means for applying liquid to the object traveling through the apparatus. Liquid jet 210 directs the flow of liquid over the object as the object passes below it on track 150. The liquid application apparatus includes a waterfall system that is essentially a closed system where liquid pump 220 draws liquid through liquid feed tube 243 out of liquid reservoir 230. In the preferred embodiment, liquid feed tube 243 has filtering means so that the liquid being drawn from liquid reservoir 230 is filtered before the liquid enters liquid pump 220. Liquid pump 220 powers liquid through liquid delivery tube 245 and subsequently to liquid jet 210. Liquid flows out of liquid jet 210 and onto the object traveling though the machine. Generally, gravity causes the excess liquid to flow through liquid drain holes 250 and into drip pan 240 where it is directed into liquid reclamation tube 247 that delivers the excess liquid back into liquid reservoir 230. In the preferred embodiment, drip pan 240 is under all stations. This can be seen in FIG. 1. Liquid drain holes 250 are holes in track 150 that allow for liquid to flow through track 150. Liquid dram holes 250 may be holes that are drilled out of track 150, or they may exist because track 150 is made of a material or structure that allows for liquid to flow though track 150.

Liquid pump 220 is capable of pumping enough liquid so that the object is completely covered with liquid when the object passes under the liquid jet 210. This requirement of a certain flow rate is a function of the power exerted by drive wheels 120 and 420, as the object will have more or less time under the jets depending on the power exerted by the drive wheels onto the object. The faster the object is moving, the greater the flow rate required from liquid pump 220. In the preferred embodiment, the object is traveling a little faster than a foot every two seconds, and the pump system moves a little less than six gallons per minute.

Jets 210 are configured with a simple slot for fluid to flow through. With respect to location of jests 210, the preferred embodiment is the one shown in FIG. 3. In the preferred embodiment, jets 210 do not atomize the liquid. Rather, the liquid pours from the jets. In other words, the object passes under a stream, or a waterfall of liquid. Thus, liquid pours over the top and both sides of the object.

Figure 4A:
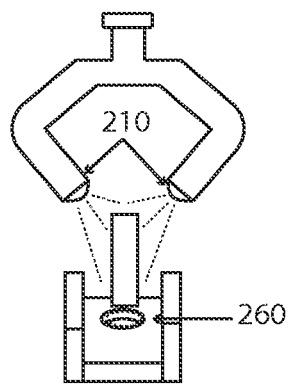
FIG. 4A is a front view of liquid application.

Referring now to FIG. 4A, pool 260 is shown on a flat track 150. Pool 260 fills with liquid so that the part of the object that is touching the track is covered with liquid when the object passes over liquid pool 260.

Figure 4B:
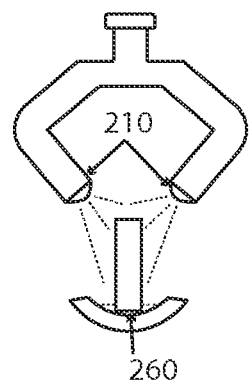
FIG. 4B is a cross-section view of liquid application.

Referring now to FIG. 4B, pool 260 is shown on a curved, or U-shaped, track 150. A U-shaped track offers the benefit of having a pool as part of the track without having to remove material, and also allows for the object to only touch the track with its corners. Further, both FIG. 4A and FIG. 4B show an object with a rectangular cross section that is being driven down track 150 in an upright position. Here, an upright position means that the object's shortest side is touching track 150. The preferred method includes driving the object down the track in the upright position for several reasons, including but not limited to applying fluid to the longest sides of the object with the waterfall, applying fluid to the shortest side with the pool, and having the least amount of friction when a flat track is used.

Figure 5:
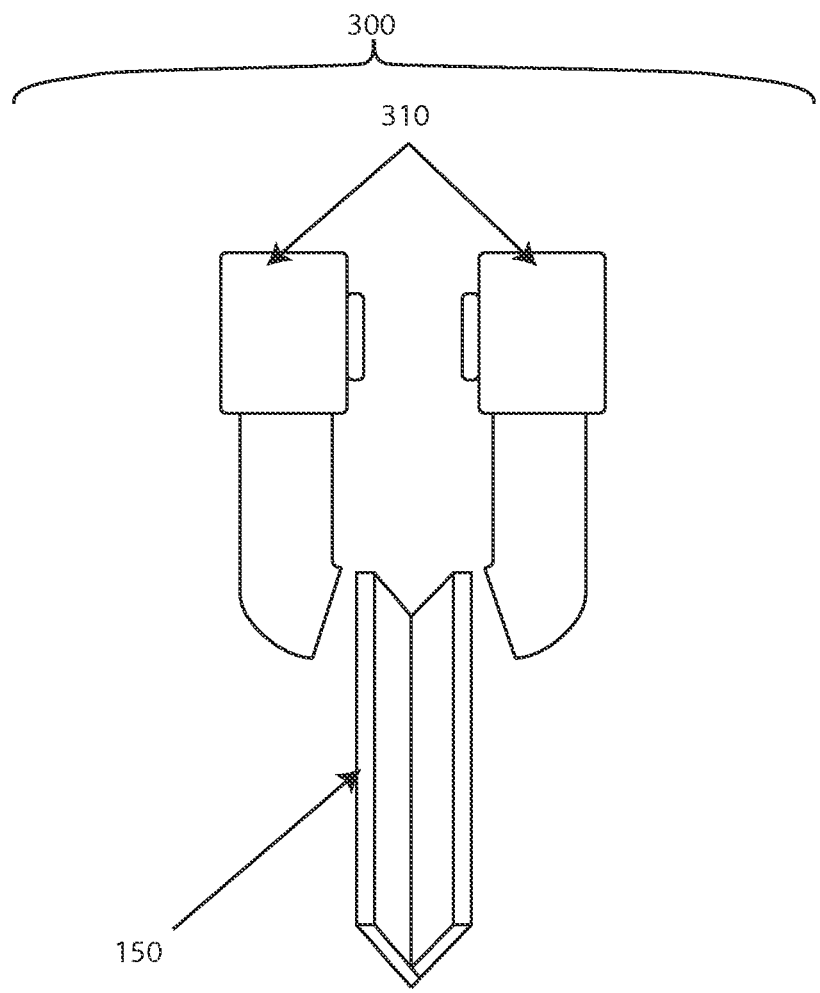
FIG. 5 is a front view of a blower station.

Referring now to FIG. 5, blower station 300 is shown. Blowers 310 apply a stream of gas, preferably air, onto the object being treated. In FIG. 5, two blowers are positioned on opposite sides of track 150 and generally angled towards each other. This stream of air provides multiple functions including removing excess liquid, and moving the wet liquid around the surface of the object so that the liquid is applied evenly. In the preferred embodiment, track 150 has additional drain holes located at blower station 300. Blowers 310 can be commercially available leaf blowers that are capable of producing an air velocity over 100 miles per hour and move over 350 cubic feet of air per minute. Further, in the preferred embodiment, the position of blowers 310 is configurable. The configurability may be achieved by frame 500 having multiple locations to releasably attach blowers 310 to frame 500.

Figure 6:
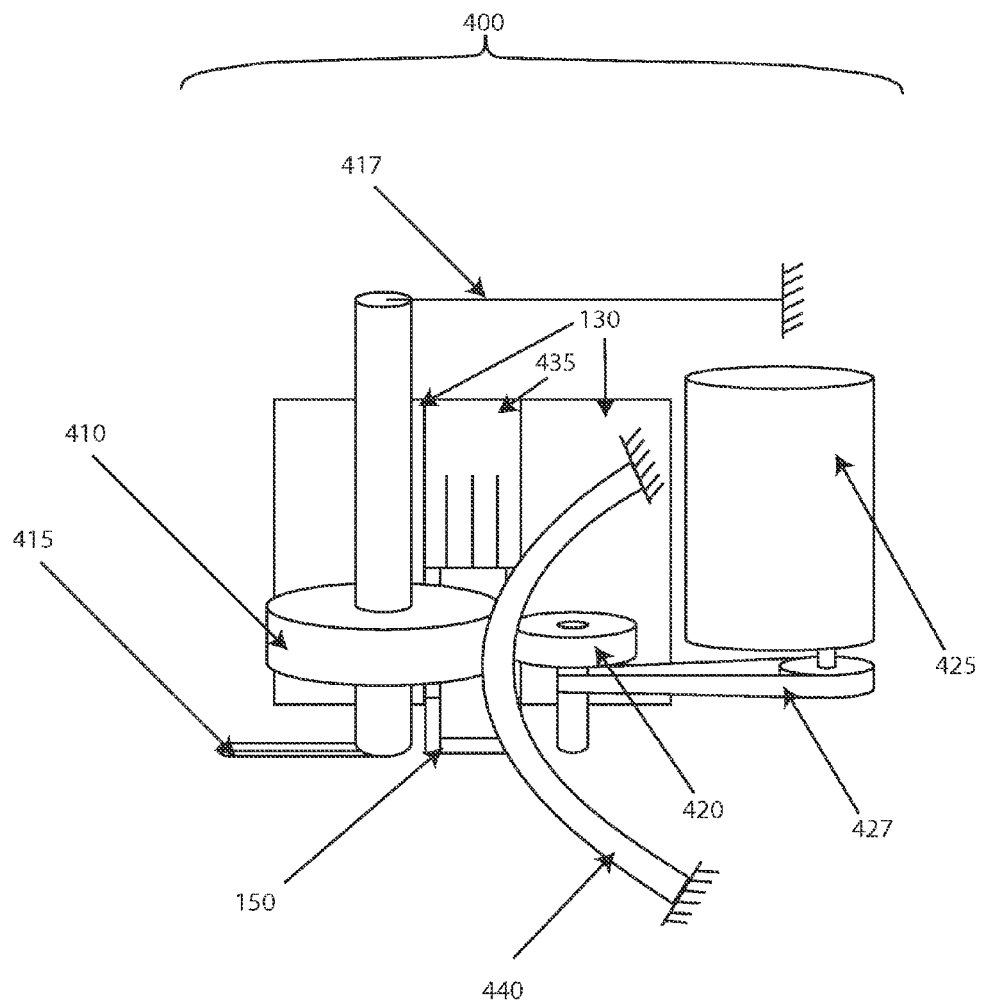
FIG. 6 is a front view of an exit station.

Referring now to the apparatus shown in FIG. 6, exit station 400 is shown. Exit station 400 has many of the same features as entry drive station 100, but has an additional feature defined as knock over means 440. Instead of allowing the objects to randomly fall out of the apparatus, knock over means 440 ensure that the object exiting the station falls in a certain direction, and can be almost any physical object that can be used for creating a predictable falling direction for objects that exit the apparatus. Knock over means 440 can be a compressed spring, or can be exit pressure wheel 410 when the axis of exit pressure wheel 410 is positioned just downstream of exit drive wheel 400.

Still referring to the apparatus shown in FIG. 6, exit drive motor 425 is shown. In this embodiment, exit drive wheel 420 has an independent drive motor, exit drive motor 425 that powers exit drive wheel 420 via exit drive means 427. But the preferred embodiment uses one drive motor to drive both exit drive wheel 420 and entry drive wheel 120. Thus, in the preferred embodiment, exit drive motor 425 and entry drive motor 125 are one motor that is attached to entry drive means 127 and exit drive means 427. In the preferred embodiment, the motor used provides three hundred and thirty inch-pounds of torque at forty rotations per minute.

Still referring to the apparatus shown in FIG. 6, exit pressure wheel 410, exit adjustment means 415, exit tension means 417, and exit drive wheel 420 are shown. These apparatuses work in the same manner as entry pressure wheel 110, entry adjustment means 115, entry tensioning means 117, and entry drive wheel 120. Similarly, the preferred embodiment includes two exit tension means 417 and two exit adjustment means 415 installed on the top and bottom of exit pressure wheel 410.

Still referring to the apparatus shown in FIG. 6, exit splash guard flap 435 is shown. Exit splash guard flap 435 is similar to entry splash guard flap in that it provides additional protection from the chemicals used within the machine, and provides means for allowing the object to pass through it while protecting the operators of the machine.

Referring now to both FIG. 6 and FIG. 2, tension means 417 and 117 may be accomplished with compression. The term tension is used because the preferred embodiment uses tension to press the object against the drive wheels 420 and 120, but compression would also work, and the apparatus is not limited by the use of tension.

Still referring to FIG. 6 and FIG. 2, exit drive wheel 420 and entry drive wheel 120 are configured to operate to ensure that the objects travelling through the machine travel at the same speed throughout the process so that all objects receive the same coverage, and that all points on each object receive the same coverage. When an object is not being driven by entry drive wheel 120, the object will be driven by exit drive wheel 420, and vice versa. Thus, the object travelling through the liquid application station 200 and blower station 300 will, be travelling at the same speed regardless of whether the object is driven by entry wheel 120, exit wheel 420, or both.

The advantages of the apparatus include, without, limitation, the ability to treat an object with liquid in a small space without brushes. Further, the apparatus allows for an object to be treated with a liquid in small batches, limiting the effect on the environment where the object is treated. In addition, the object may be treated with a liquid without atomizing the liquid, further limiting the impact on the environment at the location where the object is treated. Moreover, with respect to lumber, the current business practice of staining lumber involves shipping the lumber from the lumber yard to a location where lumber is stained in large batches, and then shipping the stained lumber back to the lumber yard. With the apparatus, a lumber yard can stain its own lumber, thereby eliminating the need to ship large amounts of lumber, and saving the energy that is expended when shipping the lumber.

In broad embodiment, the apparatus is a machine that is used to apply liquid to all sides of an object without brushes and without atomizing the liquid.

While the foregoing written description of the apparatus enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. An apparatus for applying liquid to elongated objects comprising:
   a frame including a track, wherein objects slide across the top of said track;
   at least one motor attached to said frame;
   an entry drive station generally positioned at one end of said track including at least one entry drive wheel that is coupled with and driven by said at least one motor, said entry drive station further including at least one entry pressure wheel;
   a liquid application station including a section of said track having at least one pool and at least one drain hole, said liquid application station also including a waterfall system having at least one reservoir, at least one pump, and at least one jet positioned above said track to create a waterfall of liquid wherein at least part of said waterfall pours liquid onto said track, thereby creating a waterfall of liquid to apply liquid to the objects sliding across said track;
   a blower station positioned downstream from said liquid application station having at least one blower positioned to blow gas onto an object driven through said blower station;
   an exit station positioned downstream of said blower station including an exit drive wheel that is coupled with said at least one motor, said exit station further including an exit pressure wheel; and,
   a knock over mechanism for regulating the direction that objects fall when exiting said exit station.

2. The apparatus of claim 1 wherein said track includes a U-shaped cross section.

3. The apparatus of claim 1 wherein said at least one blower is capable of moving over 350 cubic feet of air per minute.

4. The apparatus of claim 1 further comprising mechanism allowing for the distance between said entry drive wheel and said entry pressure wheel to change, and a mechanism allowing for the distance between said exit drive wheel and said exit pressure wheel to change.

5. The apparatus of claim 1 wherein the position of said at least one blower is configurable.

6. The apparatus of claim 1, wherein said at least one jet includes two jets generally angled towards each other.

7. The apparatus of claim 1 wherein said at east one blower includes two blowers, wherein each of said two blowers is positioned on opposite sides of said track and generally angled towards each other.

8. The apparatus of claim 1 wherein said knock over mechanism includes positioning the axis of said exit pressure wheel downstream of the axis of said exit drive wheel.

9. The apparatus of claim 1 further comprising splash guards.

10. The apparatus of claim 1 further comprising wheels attached to the bottom of said frame.

11. An apparatus for applying a flowable material to a manufactured building product conveyed through said apparatus comprising:
- a frame including a track, wherein said track includes a U-shaped cross-section and at least one drain hole;
- at least one motor attached to said frame;
- an infeed station positioned to drive said product down said track including at least one drive roller and at least one pressure roller, wherein said at least one drive roller is coupled with and driven by said at least one motor;
- an adjusting mechanism for adjusting the relative position of said at least one pressure roller with respect to said at least one drive roller;
- a waterfall-pool system arranged to apply the flowable material to the manufactured product conveyed through said apparatus;
- at least one blower system positioned downstream from said waterfall-pool system, wherein said at least one blower system is arranged to apply a current of air to the manufactured product conveyed through said apparatus, thereby to remove excess flowable material from the manufactured product;
- an exit station having at least one exit drive roller and at least one exit pressure roller, wherein said at least one exit drive roller is coupled with and driven by said at least one motor;
- an exit adjusting mechanism for adjusting the relative position of said at least one exit pressure roller with respect to said at least one exit drive roller; and,
- a releasably attached drop track downstream of said exit station wherein said drop track is inclined slightly so that the flowable material does not flow out of said apparatus.

12. The apparatus of claim 11 configured so that said exit drive roller and said entry drive roller generally convey said manufactured building product through the apparatus at the same speed when working together or independently.

13. The apparatus of claim 11 wherein said track includes drain holes at the general position of said blower system.

14. The apparatus of claim 11 wherein said exit pressure roller is positioned downstream of said exit pressure roller.

15. The apparatus of claim 11 wherein the position of said at least one blower is configurable.

* * * * *